US006847694B1

(12) United States Patent
Chevrette et al.

(10) Patent No.: US 6,847,694 B1
(45) Date of Patent: Jan. 25, 2005

(54) METHOD FOR DETERMINING THE SAMPLING PHASE AND METHOD FOR SYNCHRONIZATION WORD DETECTION USING THE PHASE DETECTION METHOD

(75) Inventors: Joel Chevrette, Pace (FR); Fabienne Rosset, Rennes (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/744,495

(22) PCT Filed: Jul. 23, 1999

(86) PCT No.: PCT/FR99/01819

§ 371 (c)(1),
(2), (4) Date: Jan. 24, 2001

(87) PCT Pub. No.: WO00/05849

PCT Pub. Date: Feb. 3, 2000

(30) Foreign Application Priority Data

Jul. 24, 1998 (FR) .............................................. 98 09428

(51) Int. Cl.[7] .............................. H04L 7/00; H04K 1/00
(52) U.S. Cl. ...................................... 375/365; 375/344
(58) Field of Search ............................... 375/332, 365; 341/320

(56) References Cited

U.S. PATENT DOCUMENTS

| 4,584,652 | A | * | 4/1986 | Sturza et al. ................. 702/72 |
| 4,744,086 | A | * | 5/1988 | Komly et al. ............... 714/762 |
| 5,199,047 | A | * | 3/1993 | Koch .......................... 375/231 |
| 5,539,357 | A | * | 7/1996 | Rumreich ..................... 331/17 |
| 5,566,213 | A | * | 10/1996 | Carsello ...................... 375/344 |
| 5,640,431 | A | * | 6/1997 | Bruckert et al. ............. 375/344 |
| 5,809,086 | A | | 9/1998 | Ariyavisitakul ............. 375/332 |
| 5,892,474 | A | | 4/1999 | Sugawara .................... 341/200 |
| 6,353,644 | B1 | * | 3/2002 | Cai et al. ..................... 375/350 |

FOREIGN PATENT DOCUMENTS

| EP | 380 876 A2 | 8/1990 | ........... H04L/27/00 |
| EP | 821 503 A2 | 1/1998 | ............. H04L/7/02 |

OTHER PUBLICATIONS

William G. Cowley et al., *The Performance of Two Symbol Timing Recovery Algorithms for PSK Demodulators*, 8089 IEEE Transactions on Communications, 42, No. 6, Jun. 1994, New York, US, pp 2345–2355.

* cited by examiner

*Primary Examiner*—Stephen Chin
*Assistant Examiner*—Lawrence Williams
(74) *Attorney, Agent, or Firm*—Joseph S. Tripoli; Joseph J. Lake; Ronald H. Kurdyla

(57) ABSTRACT

Method for determining the sampling phase of a signal modulated by digital modulation, is described. The method includes oversampling by factor m, the coordinates of L consecutive symbols. The oversampled coordinates of the L symbols are then converted into angular values. The angular values are folded over onto a point of the constellation of the modulation. The noise in the angular values is estimated for each oversampling phase, with respect to the point, and the oversampling phase exhibiting the lowest noise is selected. The subject of the invention is also a synchronization word detection process.

8 Claims, 4 Drawing Sheets

METHOD FOR DETERMINING THE SAMPLING PHASE AND METHOD FOR SYNCHRONIZATION WORD DETECTION USING THE PHASE DETECTION METHOD

This application claims the benefit under 35 U.S.C. § 365 of International Application PCT/FR99/01819, filed Jul. 23, 1999, which claims the benefit of French Application No. 9809428, filed Jul. 24, 1998.

BACKGROUND OF THE INVENTION

1. Field of the Invention

The subject of the invention is a method for determining the sampling phase for signals having digital modulation of n-PSK type and a method for detecting synchronization word implementing the method for determining the phase. The invention applies in particular within the context of a digital decoder in accordance with the Digital Video Broadcasting (DVB) with return channel specification.

2. Discussion of Background

To demodulate a signal modulated with the aid of a $2^n$-PSK type modulation (with constant envelope) and thus retrieve the symbols transmitted, it is necessary to sample the signal at the symbol frequency with a correct phase. The algorithm of Gardner makes it possible to determine the appropriate sampling instant. This algorithm has the drawback however of requiring a certain convergence time, during which time the symbols received are lost.

When the signal transmitted includes bursts, this convergence time may be prejudicial to the proper operation of the receiver. Specifically, a short burst may be of insufficient duration to obtain synchronization. Moreover, if the bursts are dispatched by different transmitters, it is not possible to maintain synchronization from one burst to another.

SUMMARY OF THE INVENTION

The object of the invention is consequently to propose a method of detecting synchronization preambles with determination of the sampling instants converging rapidly.

The subject of the invention is a method for determining the sampling phase of a signal modulated by digital modulation, characterized in that it comprises the steps:

of oversampling by factor m the coordinates of L consecutive symbols, of converting the oversampled coordinates of the L symbols into angular values, of folding the angular values over onto a point of the constellation of the modulation, of estimating the noise in the angular values, for each oversampling phase, with respect to the point; and of selecting the oversampling phase exhibiting the lowest noise.

According to a particular exemplary embodiment of the invention, the noise is estimated by calculating the variance of the folded-over angular values with respect to the theoretical angular value of the said point.

According to the particular exemplary embodiment, the symbols are differentially coded and the step of calculating the variance is performed on the basis of differences of angles.

According to the particular exemplary embodiment, the choice of the optimal oversampling phase is carried out every L symbols.

According to another exemplary embodiment, the method furthermore comprises the step of storing the angle difference values for determining values of variance over L symbols for each value of angle difference ("sliding variance").

The subject of the invention is also a method for detecting a synchronization word following up the method for detecting optimal phase and characterized in that it furthermore comprises the step of determining the deviation of a string of angle differences with respect to angle differences corresponding to the predetermined synchronization word, a substantially zero deviation indicating the presence of the said word.

According to a particular exemplary embodiment, the method furthermore comprises the steps:

of storing the set of difference values of oversampled angles, until the optimal sampling phase is determined;

of determining the said optimal phase;

of determining the deviation solely for the angle difference values corresponding to the said phase.

According to another exemplary embodiment, the method furthermore comprises the steps:

of accumulating, continuously as and when the angle difference values arrive, the partial deviation for each distinct sampling phase;

of determining the optimal phase;

of analysing the accumulated deviations for the optimal phase with a view to detecting the synchronization word.

BRIEF DESCRIPTION OF THE DRAWING

Other characteristics and advantages of the invention will become apparent through the description of a particular nonlimiting exemplary embodiment, illustrated by the appended figures in which.

DETAILED DESCRIPTION OF THE PREFERRED EMBODIMENT

The means for determining the optimal sampling instant will be described in a first part of the description, whilst the detecting of a synchronization word will more particularly be described in a second part.

First Part

1] General Considerations

The exemplary embodiment described hereinbelow implements values of angle corresponding to the samples of the $2^n$-PSK type signal, these values possibly being determined for example by way of the process and of the device for angular conversion as are described in WO 00/05850. The angular conversion determines, on the basis of two samples, each of 8 bits, of the signal received and respectively representing the coordinates of a point in the (I,Q) plane, an angle value coded on 6 bits. An additional bit indicates the validity or non validity of a particular angle value. For further details reference may be made to WO 00/05850. Generally, the angular converter delivers values on N+n bits, where $2^n$ is the number of points of the constellation.

Figure 1:
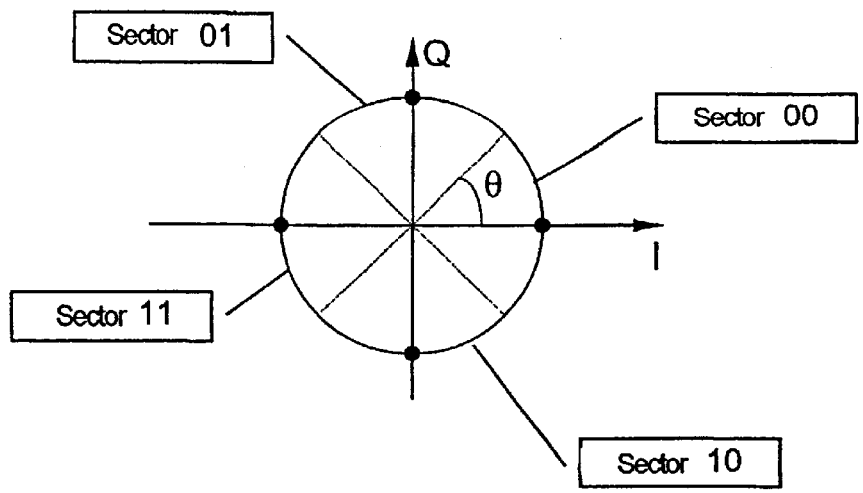
FIG. 1 is a diagram of the constellation of a QPSK modulation.

By way of example, FIG. 1 is a diagram of a constellation of a QPSK modulation in the (I,Q) plane.

2] Determination of the Sampling Phase.

Figure 2:
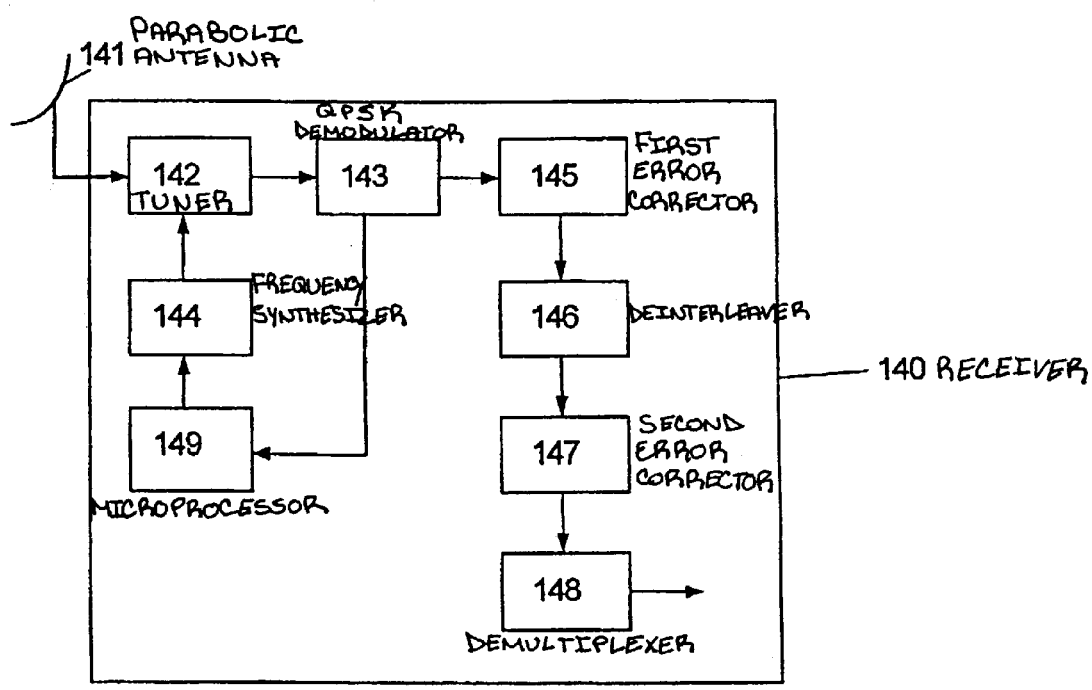
FIG. 2 is a block diagram of a receiver implementing the process according to the invention.

FIG. 2 is a block diagram of the demodulation and error correction part of a digital television receiver able to perform the frequency correction in the manner described hereinabove. This receiver 140 comprises a tuner 142 linked to a parabolic antenna 141 (or some other interface with a transmission medium, for example a cable interface) and receiving a signal originating from a frequency synthesizer 144 controlled by a microprocessor 149. The signal from the tuner 142 is demodulated by a QPSK demodulator 143 comprising among other things an analogue/digital converter carrying out the digitization of I and Q, the circuit 143 also determining the angle values from pairs of samples (I,Q). The demodulated QPSK signal is delivered to a first error corrector 145, followed by a deinterleaver 146, by a second error corrector 147 and by a demultiplexer 148.

The circuit 143 initially carries out a sampling of the signal originating from the tuner 142 at the symbol frequency multiplied by a factor s. The factor s is chosen so that the fixed error rate is adhered to for a given signal-to-noise ratio. The sampling error is 1/(2s). The samples are converted into angular values in the manner indicated in WO 00/05850. By way of example, s may be taken equal to 6. In what follows, the set of angle values of like rank over a set of samples representing L symbols will be referred to as a "class". For example, if is taken equal to 6 (this being sufficient for a QPSK modulation), then each sixth value starting from the first belongs to the second class, etc.

For the determination of the sampling phase, an analysis of the N low-order bits of the angular values is performed. In parallel, the values of symbols are determined with the aid of the n high-order bits.

Figure 3:
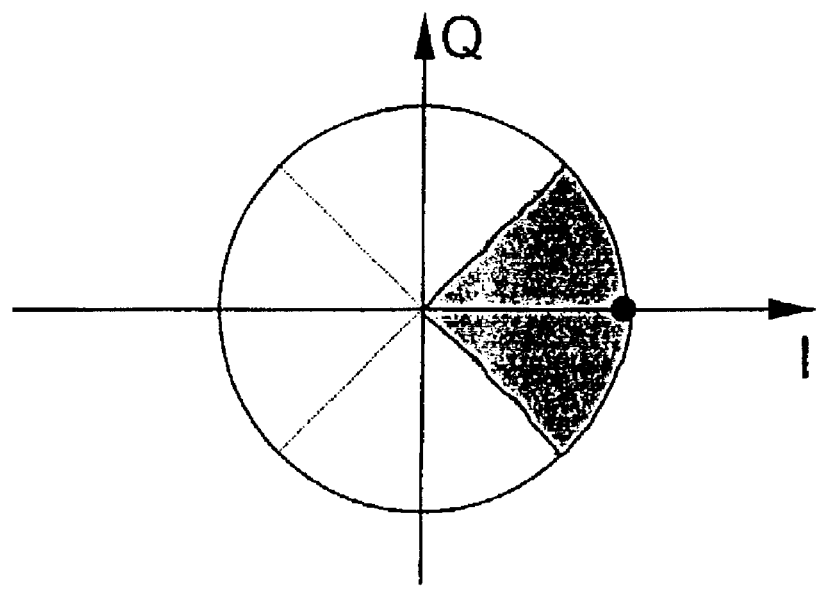
FIG. 3 is a diagram of the constellation of FIG. 1 after folding over the points of the constellation onto a single point.

The consideration of the N low-order bits amounts to folding over the constellation onto a particular sector of the (I,Q) plane, in such a way as to superimpose all the points of the constellation. FIG. 3 illustrates the case of a 4-PSK constellation (also referred to as QPSK), where the four quadrants have been folded over onto a single quadrant. Depending on the phase error incurred during the sampling, the demodulated points will form a more or less extended cluster around the ideal position. To determine the optimal phase, the dispersion of L points of one and the same class is studied. The higher L is chosen to be, the greater will be the accuracy of the phase determination.

The dispersion is evaluated by determining the variance of the angle coded on N bits. This variance is equal to:

$$Variance = \frac{\sum_0^{L-1} (Angle - avg)^2}{L} \quad (1)$$

where L is the observation length in symbols, "Angle" is the angle value on N bits and where avg is the average of the L angle values.

The smaller the variance, the tighter the points crowd around the average.

Two cases need to be distinguished as far as the determination of the sampling phase is concerned: the first case is that where the recovery of the carrier has already been undertaken, the constellation not turning, the second case being that where carrier recovery has not been undertaken, the constellation rotating.

2.1] Case where the Recovery of the Carrier has Already been Undertaken

In this case, the value of the variable "avg" in equation (1) is zero. Starting from (1), we propose to calculate (2) so as to evaluate the dispersion noise:

$$1/2 \frac{\sum_0^{L/2-1} (\Delta Angle)^2}{L/2} \quad (2)$$

$$Putting \; Optimum = \sum_0^{L/2-1} (\Delta Angle)^2 \quad (3)$$

we obtain:

Variance=Optimum/L (4).

Moreover, we shall take:

$p = \log_2 [L]$ $m = s$ $k = \log_2 [m]$ p, m and k are rounded up to the next integer in the case of real numbers.

The device for implementing the algorithm comprises:

m accumulators Accu(i) of 2N+p−2 bits, i varying from 0 to m−1

1 counter A of p bits (counting from 0 to L−1)

1 counter B of k bits (counting from 0 to m−1)

1 "Phase" register of k bits (counting from 0 to m−1)

1 "Optimum" register of 2N+p−2 bits m accumulators of N bits (I(i)), i varying from 0=m−1

The counter A indicates the order of the symbol to which an angle is referred in an observation period.

The counter B indicates the class of an angle.

The accumulators I(i) serve to contain either an angle value (for the symbols of even rank), or an angle difference (for the symbols of odd rank), doing so for the m classes in each symbol.

The accumulator Accu(i) serves to accumulate the squares of the angle differences (I(i)) for class i.

The Optimum register comprises a value proportional to the variance corresponding to the optimal phase.

The Phase register indicates the class of angle corresponding to the content of the Optimum register, namely the most advantageous sampling phase.

The algorithm "A" implemented is the following:

---

(1) Initialization of A, B and Accu (0 to m−1) to zero
(2) If A even (i.e. low-order bit at zero) then I(B) = Angle
    else    I(B) = (I(B)−Angle) modulo $2^n$
            If A=1 then Accu(B) = $[I(B)]^2$
                else Accu (B) = Accu (B) + $[I(B)]^2$
            End if
    End if
(3) If B = m−1    then    B = 0
                          If A = L−1 then A = 0
                          else A = A+1
                          End If
                  Else    B = B+1
    End If
(4) If A = 0 and [B = 0 or Optimum > Accu(B)] then
                          Optimum = Accu (B)
                          Phase = B
    End If
(5) Redo step 2 with the next angle.

---

The sought-after sampling phase is available in the Phase register every L symbols, that is to say every m*L angles. Also available is the Optimum value corresponding to this phase, and which can be used to determine the signal-to-noise ratio (SNR):

$$SNR = \frac{(L/2) \times (2^{N-1})^2 \times 2^{2n}}{Optimum \times \pi^2} = \frac{L}{2 \times Optimum} \quad (5)$$

where Optimum is expressed in square radians in the expression on the right.

In the case where $L=2^p$, the signal-to-noise ratio can be expressed by the following approximation:

$$SNR = 3(p+2N-\log_2(Optimum))-10+6n \quad (6)$$

2.2] Case where the Recovery of the Carrier has Not been Undertaken

In this case, the constellation rotates about the origin at a speed corresponding to the difference between the frequency of the carrier of the signal and the frequency of the tuner. Let $\Delta f$ be this difference. The approximation according to which the average "avg" is zero is no longer valid.

Between two consecutive angles of the same class, the angular shift will therefore be:

$$\Delta\theta = \Delta f \times \frac{2^{N+n}}{2\pi} \times \frac{1}{symbol\_frequency} \quad (7)$$

Two cases arise, according to the amplitude of $\Delta f$:
2.2.1] Case where $$\frac{\Delta f}{symbol\_frequency} < \frac{\pi}{2^{n+1}}$$

is Verified (i.e. $\Delta Angle<2^{N-2}$)

The frequency difference is such that the algorithm for determining the phase must be suitable. Specifically, it had been assumed previously that the average of the angles (coded over n bits, constellation folded over onto a single point) was zero. This approximation is no longer valid in the present case. It is proposed that this average be estimated.

The algorithm "A" is modified in the following way:

The Optimum register is extended to 2N+2p−2 bits m Average registers (i) of N−1+p−1 bits are available, i varying from 0 to m−1. These registers comprise the averages of the angles for each of the m classes.

The algorithm "A" then becomes (modifications underlined):

---

(1) Initialization of A, B and Accu (0 to m−1) to zero
    <u>Initialization of Average (0 to m−1) to zero</u>
(2) If A even (i.e. low-order bit at zero) then I(B) = Angle
            else    I(B) = (I(B)−Angle) modulo $2^n$
                    If A = 1 then Accu(B) = $[I(B)]^2$
                          <u>Average(B) = I(B)</u>
                          else Accu (B) = Accu (B) + $[I(B)]^2$
                          <u>Average(B) = Average(B) + I(B)</u>
                    End If
    End If
(3) If B = m−1 then    B = 0
                       If A = L−1    then A = 0
                                     else A = A+1
                       End If
               Else    B = B+1
    End If
(4) If A = 0 and [B = 0 or
                          <u>Optimum > ½LAccu(B)−(Average(B))$^2$</u>]
    then
            Optimum = <u>½LAccu(B)−(Average(B))$^2$</u>
            Phase = B
    End If

---

The signal-to-noise ratio then becomes:

$$SNR = \frac{L^2 \times (2^{N+n-1})^2}{2 \times Optimum \times \pi^2} \quad (8)$$

An approximation of this expression in dB is:

$$SNR=3(2p+2N-\log_2(Optimum))-16-6+6n \approx 3(\text{number of zeros in terms of high-order bits of Optimum})-1+6(n-2) \quad (9)$$

According to a variant embodiment, if $L=2^p$, it is possible to avoid the use of an extended Optimum register, by appropriately shifting the bits when calculating the content of Optimum.

We will then take:

$$Optimum=Accu(B)-2^{p-1}[Average(B)[N+p-3, \ldots, p-1]]^2$$

This amounts to taking N−1 high-order bits of the average, squaring them and shifting the whole by p−1 bits. From the notation point of view, the bits chosen from the register are indicated between square brackets following the register concerned.

The test on Optimum consequently becomes:

$$\text{Optimum} > Accu(B) - 2^{p-1}[\text{Average}(B)[N+p-3, \ldots, p-1]]^2$$

2.2.2] Case where $$\frac{\Delta f}{\text{symbol\_frequency}} < \frac{\pi}{2^{n+1}}$$

is Not Verified

It is nevertheless assumed that $$\frac{\Delta f}{\text{symbol\_frequency}} < \frac{\pi}{2^{n+1}}$$

namely $\Delta\theta < 2^{N-1}$ with $\Delta\theta$ difference of angles expressed over N+n bits. Specifically, we want $\Delta\theta$ to be less than half the angle between two points of the constellation.

As compared with section 2.2.1., there is furthermore provision for:

A one-bit "Inversion" register, m registers of N−1+p−1 bits Average'(i), i varying from 0 to m−1, m registers of 2N+p−2 bits Accu'(i), i varying from 0 to m−1.

Figure 7:
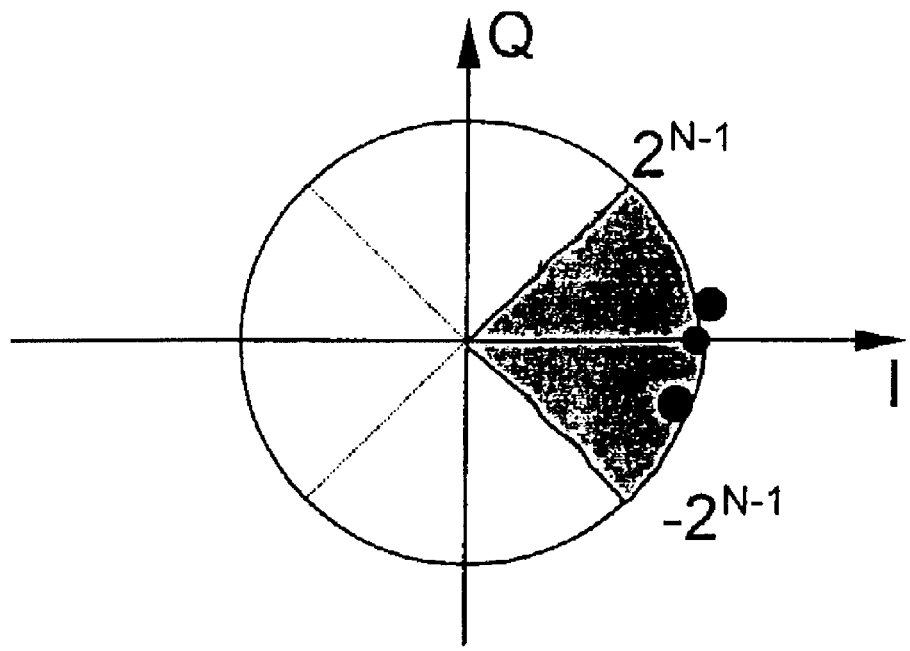
FIG. 7 is a diagram of the constellation of FIG. 1 after folding over the points of the constellation onto a single point in the case of a small frequency shift.
Figure 8:
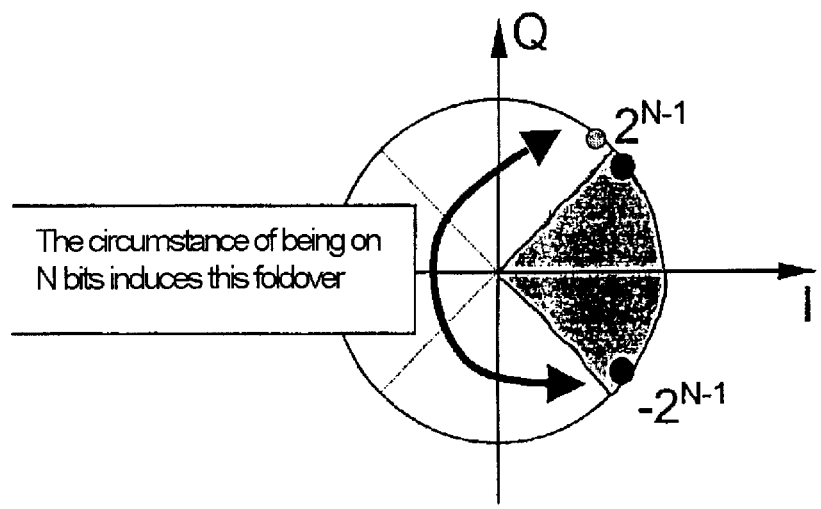
FIG. 8 is a diagram of the constellation of FIG. 1 after folding over the points of the constellation onto a single point in the case of a large frequency shift.

Given the rotation of the constellation, it may happen that the (folded over) angle values are poorly placed. Specifically, hitherto, the average was regarded as close to 0. This gave points of the constellation which were distributed as in FIG. 7. This is true as long as the average lies between +/− $\Delta\theta < 2^{N-2}$, which amounts to limiting the rotation of the constellation as seen in the above paragraph. If the rotation is greater, then we again have a distribution of angle differences in accordance with FIG. 8. The average might therefore be wrong (0 in the case of FIG. 8 instead of $2^{N-1}$). By inverting the sign bit (or high-order bit) this amounts to adding $2^{N-1}$ modulo $2^N$, this amounting to going from FIG. 8 to FIG. 7 and remembering this when allowing for the rotation of the constellation (for the evaluation of the frequency delta).

The averages of the angle differences (Average(i), respectively Average'(i)) and the squares of the angle differences (Accu(i), respectively Accu'(i)) are accumulated in parallel, while inverting the sign bit of I(B) for the accumulations of Average'(i) and of Accu'(i). The value of Optimum is compared with the variance in both cases, and the smaller variance will be retained.

The following modifications are made to the algorithm of section 2.2.1.:

(here it is assumed that the variant according to which L=$2^p$ is implemented)

(1) Initialization of A, B and Accu (0 to m−1) to zero
    Initialization of Average (0 to m−1) to zero
    Initialization of Accu' (0 to m−1) to zero
    Initialization of Average' (0 to m−1) to zero
(2) If A even (i.e. low-order bit at zero) then I(B) = Angle
    else I(B) = (I(B)−Angle) modulo $2^n$
        If A=1 then Accu(B) = [I(B)]$^2$
            Accu'(B) = [$\overline{I(B)}$]$^2$
            Average(B) = I(B)
            Average'(B) = $\overline{I(B)}$
        else Accu (B) = Accu (B) + [I(B)]$^2$
            Accu' (B) = Accu' (B) + [$\overline{I(B)}$]$^2$
            Average(B) = Average(B) + I(B)
            Average'(B) = Average'(B) + $\overline{I(B)}$
        End If
    End If
(3) If B = m−1 then B = 0
            If A = L−1 then A = 0
                else A = A+1
            End If
        Else B = B+1
    End If
(4) If A = 0 and [B = 0 or Optimum>Accu(B)−$2^{p-1}$[Average(B)[N+p−3, ..., p−1]]$^2$]
    then
        Optimum=Accu(B)−$2^{p-1}$[Average(B)[N+p−3, ..., p−1]]$^2$
        Phase = B
        Inversion = 0
    End If
(4') If A = 0 and Optimum > Accu'(B)−$2^{p-1}$[Average'(B)[N+p−3, ..., p−1]]$^2$
    then
        Optimum = Accu'(B)−$2^{p-1}$[Average'(B)[N+p−3, ..., p−1]]$^2$
        Phase = B
        Inversion = 1
    End If
(5) Redo step 2 with the next angle.

The value of the Inversion register makes it possible to determine whether the optimum phase found corresponds to the case $\Delta\theta < 2^{N-2}$ (Inversion=0) or to the case $2^{N-1} > \Delta\theta \geq 2^{N-2}$ (Inversion=1).

It is of course also possible to modify the above algorithm in the case where the simplification due to L=$2^p$ does not apply.

3] Decoding of the Symbols 3.1] Decoding of the Symbols in the Case where the Carrier has been Recovered (Differential Decoding)

The determination of a symbol is performed on the basis of the n+2 high-order bits of the angle corresponding to the optimum phase. When the symbols are coded differentially, the algorithm "B" below is applied, in parallel with the algorithm "A". That is to say by using the values of the counters A and B, of the Phase register and triggering it only once the phase and the start of preamble (cf. second part) have been found.

The algorithm uses the following registers:

the incoming angle denoted Angle[n−1 . . . −1] which comprises n+1 high-order bits of the angle determined in the General considerations paragraph of this first part.

A delta(0) register of n+1 bits.

A delta(1) register of n+1 bits.

A "symbol_transmitted" register of n bits.

From the notation point of view, the bits [n−1 . . . 0] of one of the above delta registers designate the n highest-order bits of this register, whilst the bit [−1] designates the lowest-order bit immediately following the n highest-order bits.

The algorithm "B" is as follows:
(1) Initialization of delta(0) and delta(1) to zero.
(2) If B=Phase, then
    If A is even then
        symbol_transmitted=conversion [delta(0)[n-1 . . . 0]+delta(0)[-1]]
    Else
        symbol_transmitted=conversion [delta(1)[n-1 . . . 0]+delta(1)[-1]]
    End If
End If
(3) If B=Phase, then
    If A is even then delta(0)=Angle
        delta(1)=delta (0)-Angle
        Else delta(0)=delta (0)-Angle
        delta(1)=Angle
    End If
End If
(4) Return to step 2.

The argument of the conversion function rounds the delta values (on n+2 bits) to n bits, so as to provide the sought-after n-bit symbol. For a QPSK modulation with differential coding, the Conversion function is defined by the following table of correspondences:

TABLE 1

| x | Angle | Conversion(x) |
|---|---|---|
| 00 | 0° | 00 |
| 01 | 90° | 01 |
| 10 | 180° | 11 |
| 11 | -90° | 10 |

It will be noted that according to the present exemplary embodiment, a symbol is decoded only when it has been sampled with the optimum phase ("B=Phase" Test in steps 2 and 3).

3.2] Decoding of the Symbols in the Case where the Carrier has not been Recovered (Differential Decoding)
3.2.1] Case where $$\frac{\Delta f}{\text{symbol\_frequency}} < \frac{\pi}{2^{n+1}}$$

is Verified

The frequency difference is then small enough for it to be possible to undertake the symbol decoding according to the algorithm "B" presented in point 3.1.

3.2.2] Case where $$\frac{\Delta f}{\text{symbol\_frequency}} < \frac{\pi}{2^{n+1}}$$

is Not Verified

A test relating to the "Inversion" register is added to the conversion function. If Inversion=0, the algorithm "B" does not change. If on the other hand Inversion=1, then the sign of the angle will be taken into account so as to round the argument of the conversion function.

The algorithm "B" then becomes (modifications underlined):
(1) Initialization of delta(0) and delta(1) to zero.
(2) If B=Phase, then
    If Inversion=0 then
        If A is even then
            symbol_transmitted=conversion [delta(0)[n-1, . . . , 0]+delta(0)[-1]]
        Else
            symbol_transmitted=conversion [delta(1)[n-1, . . . , 0]+delta(1)[-1]]
        End If
    Else
        If A is even then
            symbol transmitted=conversion [delta(0)[n-1, . . . , 0]+$\overline{\text{delta}(0)[-1]}$]
        Else
            symbol transmitted=conversion [delta(1)[n-1, . . . , 0]+$\overline{\text{delta}(1)[-1]}$]
        End If
    End If
End If
(3) If B=Phase, then
    If A is even then delta(0)=Angle
        delta(1)=delta(0)-Angle
        Else delta(0)=delta(0)-Angle
        delta(1)=Angle
    End If
End If
(4) Return to step 2.

In the above algorithm, the notation $\overline{X}$ signifies inversion of the most significant bit (and only that) of X.

It is moreover possible to evaluate the rotation of the constellation. This amounts to calculating the frequency difference $\Delta f$ to be compensated for at the level of the receiving tuner.

If Inversion=1, then $$\Delta f = \text{symbol\_frequency} \times \frac{\Pi}{2^{N+n-1}} \times \qquad (10)$$

$$[(-1)^x \times 2^{N-1} + \text{Average}'(\text{Phase})[N + p - 3, \ldots, p - 1]]$$

where x=Average'(Phase)[N+p-3], this corresponding to the most significant bit of Average'[Phase], that is to say the sign bit.

If Inversion=0, then $$\Delta f = \text{symbol\_frequency} \times \frac{\Pi}{2^{N+n-1}} \times \qquad (11)$$

$$[\text{Average}(\text{Phase})[N + p - 3, \ldots p - 1]]$$

The frequency generated by the tuner will have to be corrected by $-\Delta f$.

The calculation of $\Delta f$ has to be performed when A=0. Otherwise, the result will be wrong.

4] Variant of the Process of Section 2.2.2.

The angles difference I(B) is a binary number lying in the interval $[-2^{N-1}, \ldots, 2^{N-1}-1]$. The various values of I(B) can be concentrated either (case 1—FIG. 7) around the middle of this interval, about the value 0 (corresponding to 0 degrees), or (case 2—FIG. 8) at the two ends (this corresponding to +180 degrees or -180 degrees), depending on the position of the constellation. When the second case holds, the calculations of the average are wrong, since no account is taken of the fact that the two ends of the interval in fact represent the same value (+180°=-180°). When this case holds, a change of reference frame is carried out consisting in bringing the values of I(B) to the middle of the reference frame, by adding Π modulo 2Π to the values of I(B), this amounting to inverting the sign bit of I(B).

It is firstly necessary to determine whether case 1 or case 2 is verified. To do this, one counts up the number of values of I(B) located at the ends of the interval. This is achieved by counting the number of values of I(B) whose two high-order bits (I(B)[N−1] and I(B)[N−2] are 10 or 01. For this purpose, an exclusive OR ("xor") is performed between these two bits for each value of I(B).

Case 2 is considered to be verified if the number of values of I(B) at the ends is greater than L/2.

The algorithm requires:

an "Intermediate" register of the same type as for "Optimum", m registers "Accu(i)" of 2(N−1)+p−2 bits, i varying from 0 to m−1, m registers "σpos(i)" of N−1+p−2 bits, i varying from 0 to m−1, m registers "σneg(i)" of N−1+p−2 bits, i varying from 0 to m−1, a counter "nbxor" of $\log_2$ (L+1) bits, a counter "nbneg" of $\log_2$ (L+1) bits.

Each angle difference (A odd) is checked as to whether it is negative or positive. For each class i, the number of negative angle differences is counted up in nbneg. The absolute values of the differences are accumulated in σpos(i) or σneg(i), depending on the sign of each difference. nbxor indicates the number of angle differences located at the ends of the interval.

The algorithm derived from algorithm "A" of section 2.1 is as follows:

```
(1) Initialization of A, B and Accu (0 to m−1) to zero
    Initialization of σpos(0 to m−1), σneg(0 to m−1), nbxor,
    nbneg to zero
(2) If A even (i.e. low-order bit at zero)
then     I(B) = Angle
Else     I(B) = (I(B)−Angle) modulo 2ⁿ
         If A=1 then   Accu(B) = [I(B)[N−2, . . . , 0]]²
                       nbxor=I(B)[N−1] xor I(B)[N−2]
         Else          Accu (B) = Accu (B) + [I(B)[N−2, . . . , 0]]²
                       nbxor=nbxor + I(B)[N−1] xor I(B)[N−2]
         End If
End If
If I(B)[N−1] = 1 then
         If A=1 then   nbneg(B)=1
                       σneg(B)=I(B)[N−2, . . . , 0]
                       σpos(B)=0
         Else          nbneg(B)=nbneg(B)+1
                       σneg(B)=σneg(B)+I(B)[N−2, . . . , 0]
         End If
Else
         If A=1 then   nbneg(B)=0
                       σneg(B)=0
                       σpos(B)=I(B)[N−2, . . . , 0]
         Else
                       σpos(B)=σpos(B)+I(B)[N−2, . . . , 0]
         End If
End If
(3)  If B = m−1 then B = 0
                       If A = L−1    then A = 0
                                     else A = A+1
                       End If
         Else B = B+1
End If
```

-continued

```
(4)  If nbxor[p,p−1] ≠ "00" then
         Intermediate=Accu(B) + 2^N* σneg(B)+2^(2N−2)*
         nbneg(B) − [σpos(B) + σneg(B) − 2^(N−1)* nbneg(B)]² * 2^(p−1)
         Inversion = 0
     Else
         Intermediate = Accu(B) + 2^N* σpos(B)+2^(2N−2)* (L−
         nbneg(B)) − [σpos(B) + σneg(B) − 2^(N−1)* (L−
         nbneg(B)]² * 2^(p−1)
         Inversion = 1
End If
If A = 0 and [B = 0 or if Optimum > Intermediate] then
         Optimum = Intermediate
         Phase = B
End If
(5)  Redo step 2 with the next angle.
```

Taking the N−1 lowest-order bits of I(B) (that is to say I(B)[N−2, . . . , 0]) into consideration amounts to considering I(B) unsigned.

The above variant requires fewer calculations, but more registers than the version of section 2.2.2.

Second Part

1] General Considerations

A synchronization word (burst preamble) of length W, and known in advance, is to be detected. This preamble is followed by a message, the two being coded differentially according to the present example (although this is not obligatory). A priori, it will be considered that the phase can vary from one burst to the next.

2] Modification of the Process for Determining the Sampling Phase

The various methods set forth explicitly in the first part make it possible to determine the best sampling phase taking account of L consecutive symbols. If the signal comprises distinct bursts, then the L symbols must be located entirely in a burst in order for the sampling phase to be correctly determined for this burst.

To do this, one wishes to have an evaluation of the best phase for each symbol (each symbol thus being regarded as being the last of a string of L symbols) and not only every L symbols as in the first part. The method for determining the sampling phase which was set forth earlier is consequently modified by installing storage pipelines appropriately.

At each instant, an evaluation will thus be available of the signal-to-noise ratio of the current phase, that is to say that which considers the last angle received to be the $L^{th}$ symbol accumulated if A is odd, and to be the $L+1^{th}$ symbol if A is even.

The method for determining the phase of section 2.2.2. is modified in the manner below.

A pipeline storing the successive values of I(B) is provided.

Figure 4:
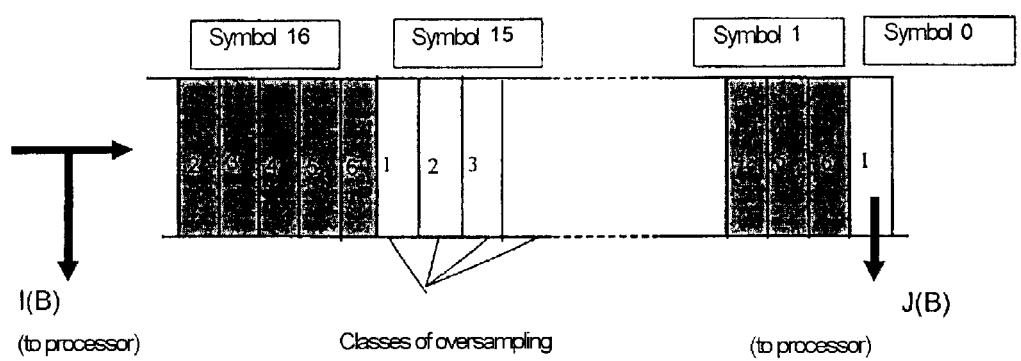
FIG. 4 is a layout of a memory of First In/First Out type used in the context of determining the sampling phase in the second part of the description.

The pipeline comprises ½L*m cells of width n and has the structure of a delay line of first in first out type. The multiplication by m is necessary to store the I(B) values for each of the M classes. The pipeline makes available L/2 values of I(B) from the past. We define J(B) as being I(B) delayed by L/2 symbols i.e. by m*L/2 clock pulse. J(B) is available at the output of the pipeline when the corresponding value of I(B) is presented at input. FIG. 4 is a diagram of the pipeline, which is loaded for each angle difference (that is to say when A is odd and when I(B) contains the angle difference and Accu(B) the angle difference squared).

The method then becomes (the modifications are not underlined):

(1) Initialization of A, B and Accu (0 to m−1) to zero
    Initialization of Average (0 to m−1) to zero
    Initialization of Accu' (0 to m−1) to zero
    Initialization of Average' (0 to m−1) to zero
    Initialization to zero of pipeline of I(B)
(2) If A even (i.e. low-order bit at zero) then
        I(B) = Angle
    else I(B) = (I(B)−Angle) modulo $2^n$
        Read J(B) from pipeline
        Accu (B) = Accu (B) + $[I(B)]^2 - [J(B)]^2$
        Accu' (B) = Accu' (B) + $[\overline{I(B)}]^2 - [\overline{J(B)}]^2$
        Average(B) = Average(B) + I(B) − J(B)
        Average'(B) = Average'(B) + $\overline{I(B)} - \overline{J(B)}$
        Store I(B) in pipeline
    End If
(3) If B = m−1 then B = 0
            If A = L−1    then A = 0
                          else A = A+1
            End If
        Else B = B+1
    End If
(4) If A = 0 and [B = 0 or Optimum > Accu(B)−$2^{p-1}$
    $[Average(B)[N+p-3, \ldots, p-1]]^2$
    then
        Optimum = Accu(B)−$2^{p-1}$ $[Avearge(B)[N+p-3, \ldots, p-1]]^2$
        Phase = B
        Inversion = 0
    End If
(4') If A = 0 and Optimum > Accu'(B)−$2^{p-1}$[Average'(B)[N+p-3, \ldots, p-1]]^2$
    then
        Optimum = Accu'(B)−$2^{p-1}$ [Average'(B)[N+p-3, \ldots, p-1]]^2$
        Phase = B
        Inversion = 1
    End If
(5) Redo step 2 with the next angle.

In the second step, the calculations are performed in such a way that Accu, Accu', Average and Average' always contain the up-to-date values for the last L symbols. This is achieved by appropriately deducting J(B), in parallel with the addition of I(B), from Average(B) and Average'(B), and by deducting $J(B)^2$, in parallel with the addition of $I(B)^2$, from Accu(B) and Accu'(B).

We thus obtain an evaluation of the best phase and of the signal-to-noise ratio.

3] Identification of the Preamble

Figure 5:
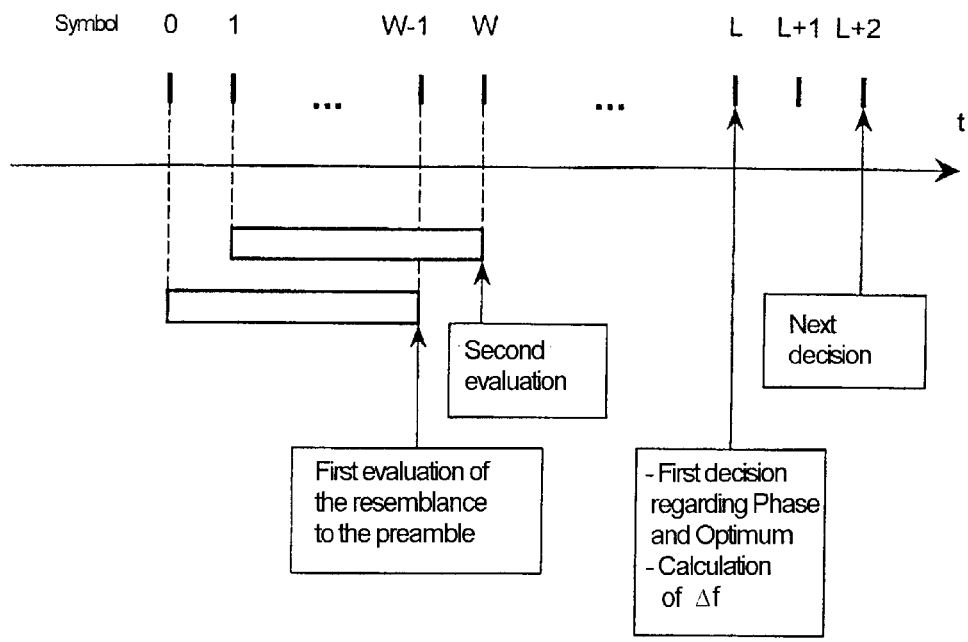
FIG. 5 is a time chart indicating with respect to the symbols in the signal received the instants of determination of the sampling phase and of the evaluations of the synchronization word to be detected.

However, the preamble still needs to be identified. Two cases may arise:

Case (a): The resemblance to the sought-after preamble is calculated continuously. And only one value is retained per symbol: that of the "correct phase". This case is illustrated by FIG. 5.

Case (b): We expect to ascertain the correct phase in accordance with the process described in the first part, then we apply the recognition of the preamble. This requires having to store the n high-order bits of the angles which allowed the evaluation of the correct phase by using their N low-significant bits.

The method used requires (in addition to what is needed to determine the correct phase):

A pipeline of width n and of length m*(L+1),

Two registers delta(0) and delta(1), of length n+2 (which are different from the delta registers used in the algorithms of the first part), The "Inversion" register of 1 bit which comes from the determination of the "correct phase", A "symbol" register of n+2 bits.
(1) Initialization of delta(0) and delta(1) to zero Initialization to zero of the pipeline and of its position pointer.
(2) Wait for the angle value on N+n bits. Symbol=n+2 high-order bits of the angle.
(3) If A is even then
    delta(0)=symbol
    delta(1)=delta(1)−symbol
Else delta(1)=symbol
    delta(0)=delta(0)−symbol
(4) If A is even then the pipeline is fed with
    delta(1)[n−1, \ldots, 0]+delta(1)[−1]xor Inversion
Else the pipeline is fed with
    delta(0)[n−1, \ldots, 0]+delta(0)[−1]xor Inversion
(5a) We calculate Deviation for each value of B. Each value of Deviation is stored, while awaiting the determination of the optimal phase.

$$\text{Deviation}(B) = \sum_{i=0}^{W-2} [\text{Pipeline}(i \times m + B) - C(i)]^2 \bmod 2^n$$

where C(i) is the angle difference expected (see hereinbelow).
(5b) We calculate Deviation solely for the optimal phase ("B=Phase").

$$\text{Deviation} = \sum_{i=0}^{W-2} [\text{Pipeline}(i \times m + \text{Phase}) - C(i)]^2 \bmod 2^n$$

Note: either the solution (5a) or the solution (5b) will be chosen.

Solution (5a) demands less memory, but more processing than solution (5b): the value Deviation needs to be stored for each class (i.e. each possible phase), doing so continuously for each symbol until the optimal phase is determined. FIG. 5 shows that this optimal phase can be obtained up to L−W symbols later. This solution avoids having to store all the angle differences on n bits during all the m*(L+1) phases and the size of the pipeline memory can be reduced.

Solution (5b) demands more memory, in the sense that it is necessary to store the differences on n bits for all the m*(L+1) phases, the calculation of Deviation being performed however only once the optimal phase has been chosen, on the basis of the single series of angle differences corresponding to this phase, thereby reducing the number of calculations to be performed by a factor m.

The preamble will be assumed to be detected when Deviation is zero (or below a given threshold) for the optimal phase.

Steps 2 to 4 serve to fill the pipeline with the successive angle differences. The Conversion function used in sections 3.1. and 3.2. is not necessary here: we do not seek to determine the symbols since we shall compare the stored angle differences directly with those corresponding to the expected preamble.

The comparison calculations, involving determining the deviation as defined in steps (5a) and (5b), are performed on the basis of the values stored in the pipeline.

An exemplary application of this algorithm can be given with the preamble CCCCCC0D (hexadecimal), which is the preamble used in certain applications such as DVB-RC (Return Channel) or else DAVIC 1.1 (Digital Audio VIdeo Council). In QPSK, the length of this preamble is W=16 symbols of two bits (i.e. n=1).

In its first row (Δ) Table 2 indicates the differential angular coding of the preamble. The second row comprises the pointer i of the pipeline containing the angle differences. The third row C(i) indicates the angle difference expected in the pipeline if the latter contains the preamble. The last row (Md: Modification) indicates the difference expected between the (i+1)th symbol of the preamble and the ith.

TABLE 2

| Δ | Π | Π | Π | Π | Π | Π | Π | Π | Π | Π | Π | 0 | 0 | Π | −Π/2 |
|---|---|---|---|---|---|---|---|---|---|---|---|---|---|---|---|
| i | 0 | 1 | 2 | 3 | 4 | 5 | 6 | 7 | 8 | 9 | 10 | 11 | 12 | 13 | 14 |
| C(i) | 10 | 10 | 10 | 10 | 10 | 10 | 10 | 10 | 10 | 10 | 10 | 00 | 00 | 10 | 11 |
| Md | 00 | 00 | 00 | 00 | 00 | 00 | 00 | 00 | 00 | 00 | 10 | 00 | 10 | 11 | 11 |

According to a variant embodiment, the calculation of the difference in the determination of Deviation can be introduced at pipeline level, by inserting an adder with two inputs between two consecutive registers corresponding to one and the same class, the adder moreover receiving the appropriate value of Md. In this case, the determination of Deviation can be summarized as follows:

$$\text{Deviation} = \sum_{i=0}^{W-2} [\text{Pipeline}(m*i + \text{Phase})]^2$$

Figure 6:
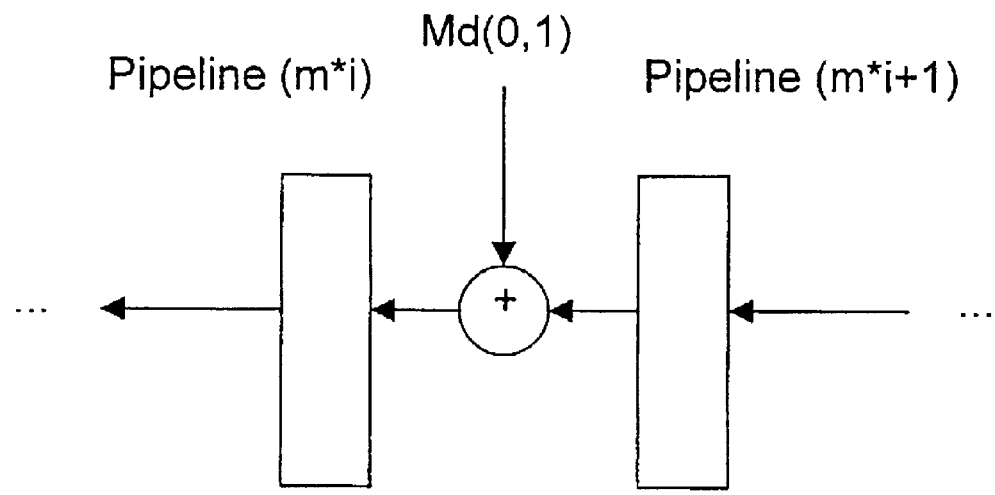
FIG. 6 is a layout of a segment of memory of first in first out type used in the detection of the synchronization word.

FIG. 6 illustrates this case.

What is claimed is:

1. Method for determining the sampling phase of a signal modulated by digital modulation, wherein the method comprises the steps of:
   oversampling by factor m the coordinates of L consecutive symbols,
   converting the oversampled coordinates of the L symbols into angular values,
   folding the angular values over onto a point of a constellation of the modulation,
   estimating the noise in the angular values, for each oversampling phase, with respect to the point,
   selecting the oversampling phase exhibiting the lowest noise.

2. Method according to claim 1, wherein the noise is estimated by calculating the variance of the folded-over angular values with respect to a theoretical angular value of the said point.

3. Method according to claim 2, wherein the symbols are differentially coded and in that the step of calculating the variance is performed on the basis of differences of angles.

4. Method according to claim 1, wherein selecting the oversampling phase is carried out every L symbols.

5. Method according to claim 2, wherein the method further comprises the step of storing the angle difference values for determining values of variance over L symbols for each value of angle difference ("sliding variance").

6. Method for detecting a synchronization word comprising the steps according to claim 5, wherein the method further comprises the step of determining a deviation of a string of angle differences with respect to angle differences corresponding to the predetermined synchronization word, a substantially zero deviation indicating the presence of the said word.

7. Method according to claim 6, wherein the method further comprises the steps of:
   storing the set of difference values of oversampled angles, until the optimal sampling phase is determined;
   determining the said optimal phase; and
   determining the deviation solely for the angle difference values corresponding to the said phase.

8. Method according to claim 6, wherein the method further comprises the steps:
   accumulating, continuously as and when the angle difference values arrive, the partial deviation for each distinct sampling phase;
   determining the optimal phase; and
   analyzing the accumulated deviations for the optimal phase with a view to detecting the synchronization word.

* * * * *